T. H. SIDDALL.
GEARING.
APPLICATION FILED JUNE 1, 1910.
985,463.
Patented Feb. 28, 1911.
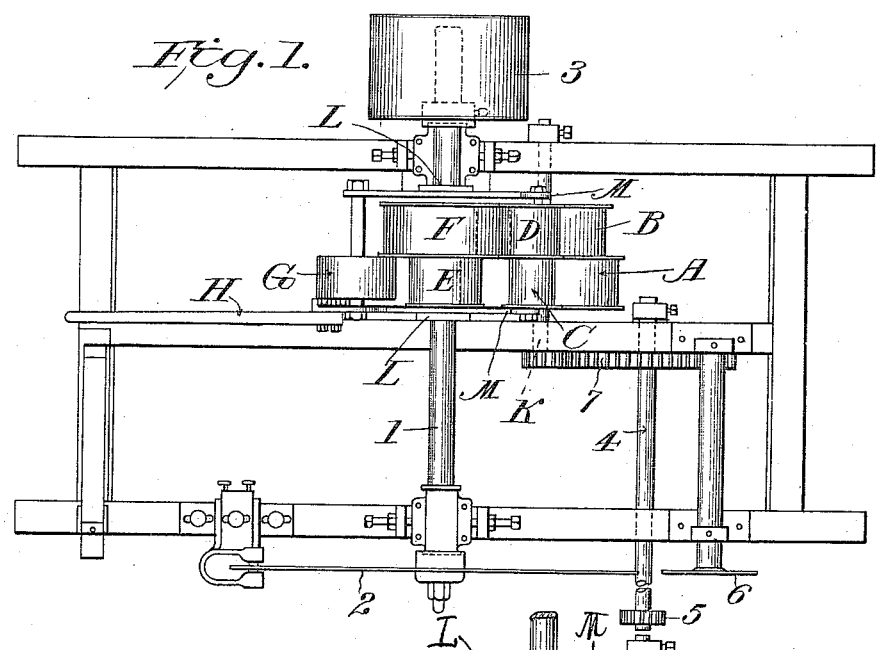
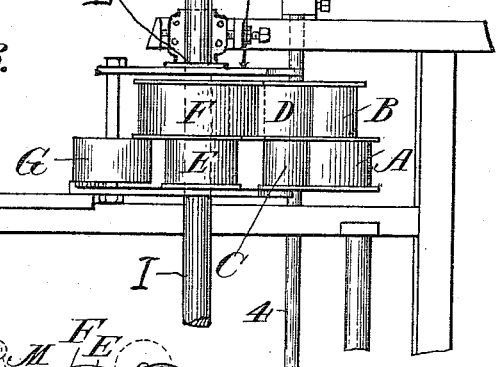
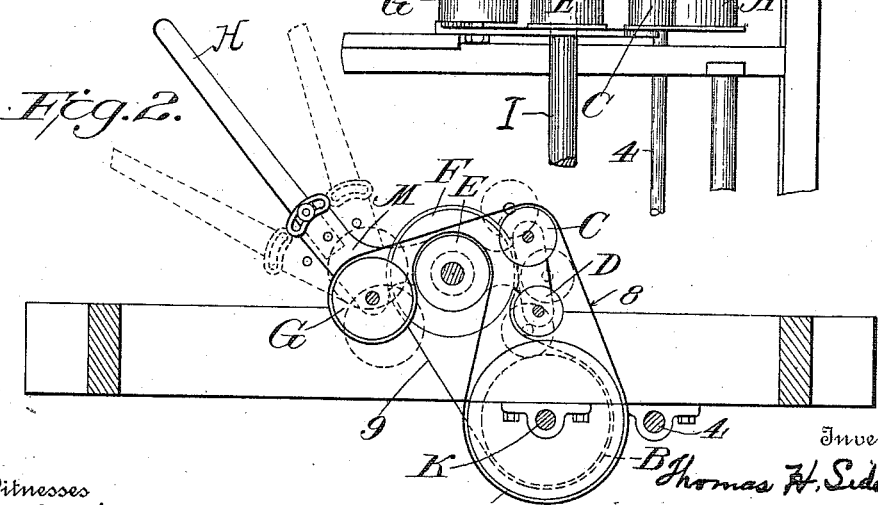
Witnesses
Inventor
Thomas H. Siddall
By
Sturtevant & Mason
Attorneys

UNITED STATES PATENT OFFICE.

THOMAS HENRY SIDDALL, OF SUMTER, SOUTH CAROLINA, ASSIGNOR TO SUMTER MACHINERY COMPANY, OF SUMTER, SOUTH CAROLINA, A CORPORATION OF SOUTH CAROLINA.

GEARING.

985,463.  Specification of Letters Patent.  Patented Feb. 28, 1911.

Application filed June 1, 1910. Serial No. 564,520.

*To all whom it may concern:*

Be it known that I, THOMAS H. SIDDALL, a citizen of the United States, residing at Sumter, in the county of Sumter, State of South Carolina, have invented certain new and useful Improvements in Gearing, of which the following is a description, reference being had to the accompanying drawing and to the letters and figures of reference marked thereon.

My invention relates to an improvement in saw mill feed works, in which a forward feed and a backing feed are given to the log carriage to drive the same to and from the saw, by means of belts which are respectively brought into action for this purpose.

Various attempts have been made to simplify the construction of the feed works, by reduction in number and re-arrangement of belts, but in all those arrangements with which I am familiar, the belts and sawyer's lever mechanism are spread over a considerable extent, the belts are long, there is undue friction and consequent wear and heating of the parts.

It is the object of my invention to provide a simple, compact, durable and quick-acting apparatus, or one in which short belts may be used, running nearly vertically, and which while especially designed for saw mill feed works, may be used in connection with other machinery requiring a variable backward and forward feed.

The main feature of my invention consists in providing a variable belt feed which works concentric with the saw mandrel.

It consists further in providing a single shift frame concentric with the saw mandrel.

Again it consists in providing on the saw mandrel the driving pulleys for the forward and backing feed, with a shift frame, concentric with said saw mandrel, for controlling the feed.

It finally consists in the various matters hereinafter described and referred to in the appended claims.

The invention is illustrated in the accompanying drawings, in which,—

Figure 1 represents a plan view of so much of a saw mill feed works as is necessary to a correct understanding of my invention; Fig. 2 is a side view mostly in elevation, one of the side timbers being removed; and Fig. 3 is a view similar to Fig. 1, but illustrating the driven pulleys on the feed shaft instead of on the intermediate shaft.

It will be understood as above intimated, that while the invention has been designed for saw mill feed works, and is so illustrated, that it need not be thus restricted.

In these drawings, the framework is of the usual construction. 1 is the saw mandrel carrying the head which supports the saw 2, the mandrel being journaled on the framework, and driven by the usual belt wheel 3. The feed shaft 4 has the usual pinion 5 which drives the log carriages, and 6 is the usual kerf spreader.

M, M, represent the two sides of a shift frame held together by three spacing studs and pivoted on two trunnions L, L, fastened to the saw frame concentric with the saw mandrel 1, which frame M, M, is swung in one direction or another on its trunnions by means of the sawyer's lever H.

K represents a shaft intermediate the saw mandrel and the feed shaft 4, and having a pinion meshing with the gear wheel 7 on the feed shaft. On this intermediate shaft K are mounted the forward feed driven pulley A, and the backing feed driven pulley B, but it will be understood that as shown in Fig. 3, the intermediate shaft K may be dispensed with, and the pulleys A and B mounted on the feed shaft 4.

E is the forward feed driving pulleys, and F the backing feed driving pulley, both mounted on the saw mandrel. On the spacing studs of the frame are mounted respectively a jack pulley G, an idler pulley C and a tightener pulley D. The forward feed belt is shown at 8, and passes around the jack pulley G, then around the driving pulley E on the saw mandrel; then around the driven pulley A back over the idler pulley C, which holds the slack side of the belt clear of the pulling side of the belt as it passes around the pulley E. The forward feed is operated by pulling the lever H forward, thus tightening the forward feed belt in the driven pulley A.

The backing feed belt 9 passes around the driving pulley F on the saw mandrel, and then around the driven backing pulley B. The backing feed is operated by pushing the lever H forward past the point where the forward feed belt is released, and until it is tightened by tightener pulley D.

The frame M, M, and the pulleys supported on it are accurately balanced and will stand still in intermediate position when the forward and backing feeds are not in operation, and the operator desires the carriage to remain inactive in any selected position.

It will be seen that this mechanism possesses the following salient features: The feed works around the same centers as the saw mandrel. The driven feed pulleys are located with their faces nearly vertically below the faces of the feed drivers on the saw mandrel, and consequently, I am enabled to use short belts running nearly vertical. The feed requires no extra jack stand pulleys, shaft, etc., at the opposite side of the mandrel from the feed shaft, but is all contained within a small space and has comparatively few parts. The idler holds the slack side of forward feed belt clear of pulling side of this belt as it passes around driving forward pulley E on mandrel. Other belt feeds require the jack arrangement referred to above, located on one end of saw-frame, their feed running on opposite end, with the saw-mandrel in the middle, and long belts running horizontally, causing a long movement of feed-operating lever, on account of the extra stretch of long belts. These long belts necessarily rub on both driving and driven feed pulleys all of the time, when either forward or backing feed or both are inactive, therefore causing friction, heating and useless belt wear.

Having thus described my invention, what I claim as new and desire to secure by Letters Patent, is:—

1. In combination with a driving shaft and a driven shaft, belt gearing for imparting forward and backward rotation to the driven shaft, and a shift frame supporting a part of the belt gearing and arranged concentric with the driving shaft.

2. In combination with the driving shaft, forward and backward driving pulleys thereon, a driven shaft, driven pulleys thereon belted respectively to the said driving pulleys, and a shift frame concentric with the driving shaft, and pulleys carried thereby adapted to engage one or the other of said belts.

3. In combination with the driving shaft, the forward and backward driving pulleys thereon, a driven shaft, driven pulleys thereon belted respectively to said driving pulleys, and a shift frame mounted on trunnions on the supporting framework concentric with the driving shaft, and a jack pulley, an idler pulley and a tightener pulley mounted on said shift frame.

4. In combination with the driving shaft, the forward and backward driving pulleys thereon, a driven shaft, driven pulleys thereon belted respectively to said driving pulleys, and a shift frame mounted on trunnions on the supporting framework concentric with the driving shaft and composed of two plates spaced by suitable studs, and a jack pulley, an idler pulley, and a tightener pulley mounted on said studs.

In testimony whereof I affix my signature, in presence of two witnesses.

THOMAS HENRY SIDDALL.

Witnesses:
JAS. McCUKHEN,
B. W. SEGARS.

Copies of this patent may be obtained for five cents each, by addressing the "Commissioner of Patents, Washington, D. C."